United States Patent [19]

Moriguchi et al.

[11] Patent Number: 4,495,507

[45] Date of Patent: Jan. 22, 1985

[54] MULTICOLOR TRANSFER HEAT-SENSITIVE RECORDING APPARATUS

[75] Inventors: Fujio Moriguchi; Masami Kurata, both of Kanagawa, Japan

[73] Assignee: Fuji Xerox Co., Ltd., Tokyo, Japan

[21] Appl. No.: 459,076

[22] Filed: Jan. 19, 1983

[30] Foreign Application Priority Data

Jan. 20, 1982 [JP] Japan .................................. 57-6133

[51] Int. Cl.³ ..................... G01D 15/10; G01D 15/24; B41J 31/02; B41J 17/08
[52] U.S. Cl. ................................. 346/76 PH; 346/46; 400/120
[58] Field of Search .............. 346/46, 76 PH; 400/120

[56] References Cited

U.S. PATENT DOCUMENTS

| | | | |
|---|---|---|---|
| 4,321,518 | 3/1982 | Anamatsu | 318/696 |
| 4,408,212 | 10/1983 | Moriguchi et al. | 346/76 PH |
| 4,410,897 | 10/1983 | Moriguchi et al. | 346/76 PH |
| 4,447,818 | 5/1984 | Kurata et al. | 346/76 PH |

*Primary Examiner*—E. A. Goldberg
*Assistant Examiner*—Gerald E. Preston
*Attorney, Agent, or Firm*—Sughrue, Mion, Zinn, Macpeak & Seas

[57] ABSTRACT

A multicolor transfer heat-sensitive recording apparatus for thermally transfer-recording images onto a recording paper 1, comprises a first and a second thermal head for selectively heating ink donor sheets of different color, first and second drive feed units for drivingly feeding the recording paper and the ink donor sheets and a pulse generator for feeding pulses to the first and second drive feed units. The first and second drive feed units include first and second backing rollers, first and second stepping motors (such as synchronous inductor motors) drivingly connected to the backing rollers and first and second drivers for driving the stepping motors, respectively. The pulse generator simultaneously feeds for a predetermined duration a single pulse to the first driver for driving the first roller and a number of pulses to the second driver for driving the second roller. The number of pulses to the second driver being adjustable to possibly reduce a recording displacement due to dimensional differences of the rollers attendant to the first and the second thermal head.

2 Claims, 2 Drawing Figures

MULTICOLOR TRANSFER HEAT-SENSITIVE RECORDING APPARATUS

BACKGROUND OF THE INVENTION

This invention relates to a multicolor transfer heat-sensitive recording apparatus which records data in multicolor according to a transfer type heat-sensitive recording system.

In the transfer type heat-sensitive recording system, a recording sheet or ordinary paper is laid on an ink donor sheet or thermally recording medium, and a thermal pulse is applied to the ink donor sheet. A layer of ink, which is fluidized or sublimated when heated, is formed on the ink donor sheet. Therefore, the ink in the part of the ink donor sheet where the thermal pulse is applied is transferred onto the recording sheet, so that the image data is recorded thereon. Accordingly, in the recording system, multicolor recording can be carried out with a plurality of recording stations arranged along the recording sheet conveying path.

FIG. 1 shows the principle of conveying an ink donor sheet and a recording sheet in a recording station. The recording sheet 1 is moved in the direction of the arrow along a conveying path 2 indicated by the dotted line, and a sensor (not shown) detects when the front edge of the recording sheet 1 comes near a thermal head 3, to start an electric motor 4. A back roller 5 is confronted with the thermal head 3. The torque of the motor 4 is transmitted to the back roller 5 through a belt 6 and a pulley 7 coupled directly to the rotary shaft of the back roller 5. As the back roller 5 is turned, the ink donor sheet 9 supplied from a supply roll 8 is conveyed in the direction of the arrow while being pressed against the thermal head 3, so as to be wound on a take-up roll 11. In this operation, the recording sheet 1 is conveyed in the same direction while being held between the ink donor sheet 9 and the cylindrical surface of the back roller 5.

In the recording system, the ink donor sheet and the recording sheet are conveyed by a feed roller such as a back roller for conveying a recording sheet and other components such as for instance a motor for driving the feed roller. Therefore, if the components of the recording stations in the entire recording apparatus are different in dimension or electrical characteristic from one another, then the amounts of auxiliary scanning per line of a recording sheet in these recording stations become different from one another. Accordingly, the accumulation of the differences results in a color shift. The occurrence of accumulated error of the drive source, namely, the motor may be prevented by employment of a stepping motor. On the other hand, if the feed rollers such as back rollers are slightly different in diameter from one another, the differences are accumulated as the rollers turn.

In a conventional multicolor transfer heat-sensitive recording apparatus, in order to prevent the occurrence of color shift due to the accumulation of such differences, the force of depression between the thermal head and the back roller is adjusted for instance, so that the diameter of the roller is substantially varied. However, such mechanical adjustment can be achieved only by a skilled person. In addition, sometimes the force of depression of the ink donor sheet against the thermal head is unsuitable for recording; that is, the ink transferring characteristic is lowered.

SUMMARY OF THE INVENTION

In view of the foregoing, an object of this invention is to provide a multicolor transfer heat-sensitive recording apparatus in which, even if components in a drive system for conveying recording sheets are different in dimension from one another, an amount of auxiliary scanning per line of a recording sheet can be electrically adjusted with sufficiently high accuracy.

The foregoing object and other objects of the invention have been achieved by the provision of a multicolor transfer heat-sensitive recording apparatus in which, according to the invention, one of the recording sheet conveying drive sources in a plurality of recording stations is a stepping motor whose exciting current is fixed, and the remaining are stepping motors which carry out mini-angle step excitation, and in which the number of feed pulses is adjusted for the latter stepping motors so that the amount of auxiliary scanning per line is made sufficiently close to that of the former stepping motor.

DETAILED DESCRIPTION OF THE PREFERRED EMBODIMENTS

This invention will be described with reference to its embodiment.

Figure 1:
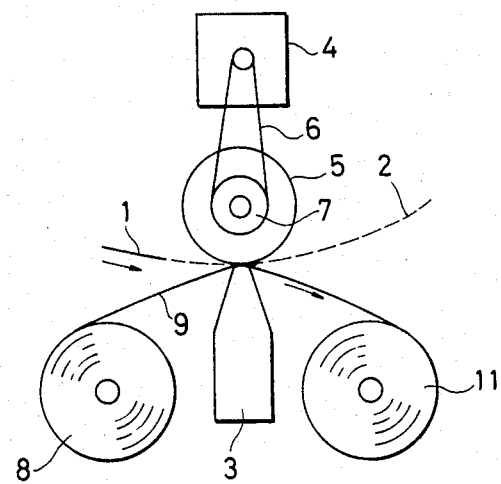
FIG. 1 is an explanatory diagram for a description of the principle of conveying an ink donor sheet and a recording sheet in a recording station of a transfer type heat-sensitive recording apparatus.
Figure 2:
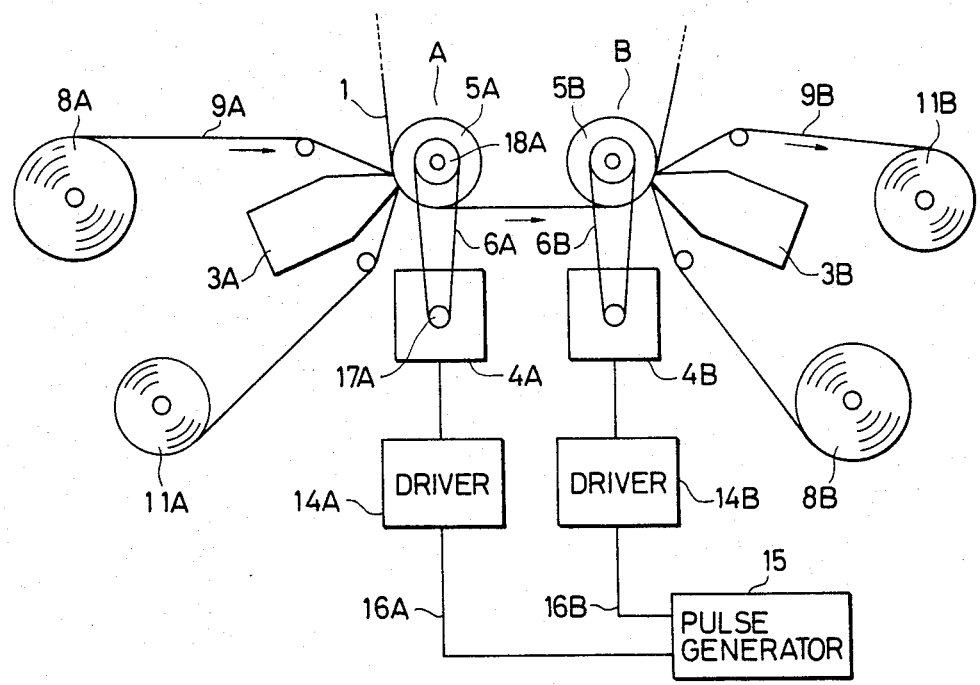
FIG. 2 is an explanatory diagram outlining the arrangement of a transfer type heat-sensitive recording apparatus which carries out a two-color recording operation, according to one embodiment of the invention.

FIG. 2 shows the essential components of a multicolor transfer heat-sensitive recording apparatus according to the embodiment of the invention, which carries out a two-color printing operation in this case. The apparatus has a first recording station A for a black recording operation, and a second recording station B for a red recording operation. In the first recording station A, a first ink donor sheet 9A coated with black ink is supplied from a first supply roll 8A. The first ink donor sheet 9A is fed through a first thermal head 3A and a first back roller 5A and is then wound on a first take-up roll 11A. Similarly in the second recording station B, a second ink donor sheet 9B coated with red ink is supplied from a supply roll 8B. The second ink donor sheet 9B is fed through a second thermal head 3B and a second back roller 5B and is then wound on a second take-up roll 11B. First and second stepping motors 4A and 4B are provided in the recording stations A and B, to drive the back rollers 5A and 5B, respectively. The first and second stepping motors 4A and 4B are driven by an ordinary driver 14A and a mini-angle driver 14B, respectively. A feed pulse generating circuit 15 applies first and second feed pulses 16A and 16B to the drivers 14A and 14B, respectively. The stepping motors, the drivers and the feed pulse generating circuit are well known per se in the art to which the invention pertains.

It is assumed that, in the multicolor transfer heat-sensitive recording apparatus, the diameter of the back rolls 5A and 5B be 16.55 mm and the tolerance be ±0.05 mm. In the worst case, two back rollers having diameters of 16.60 mm and 16.50 mm are installed in one recording apparatus. When each of the back rollers 5A and 5B makes one revolution, an error of 0.314 mm in the movement of the recording sheet 1 occurs. The error, being accumulated as the back rollers turn, is increased to 1.8 mm at the rear edge of a recording sheet of size "A4."

In order to eliminate the accumulated error to the extent that it can be visually disregarded, the mini-angle driver 14B in the embodiment carries out a mini-stepping operation in which one step drive is effected with 512 feed pulses. On the other hand, the ordinary driver 14A operates to permit the motor to conduct one step rotation with one feed pulse.

It is assumed that, upon reception of one feed pulse 16A, the ordinary drive 14A turn the first stepping motor 4A through 1.8 angular degrees. It is further assumed that the pulley ratio of the pulleys 17A and 18A which are coupled directly to the rotary shafts of the first stepping motor 4A and the first back roller 5A, respectively, be 1:2, and the diameter of the first back roller 5A be 16.55. In this case, whenever one feed pulse 16A is produced, the first back roller 5A is turned through 0.9 degrees and the recording sheet 1 and the first ink donor sheet 9A are stepped by 130$\mu$. The mini-angle driver 14B carries out the mini-stepping operation as described above. Therefore, in the case where the diameter of the second back roller 5B is 16.50 mm, whenever one feed pulse 16B is provided the second back roller 5B is turned through 0.9/N degree and the recording sheet 1 and the first ink donor sheet 9A are advanced by 0.253$\mu$. Note that N is the preset reference pulse number of the second stepping motor 4B and is a fixed value, 512, in the embodiment.

It is assumed that the feed pulse generating circuit 15 be so adjusted that 514 feed pulses 16B are provided to the second step motor 4B whenever one first feed pulse 16A is produced. When 400 first feed pulses are produced, the first back roller 5A makes a turn and the recording sheet 1 is moved 51.993 mm. In this operation, 400$\times$514 second feed pulses are produced, and the recording sheet 1 is moved 52.039 mm. Accordingly, in this case, whenever the first back roller 5A makes one revolution, an error of 0.046 mm occurs. The error will be 0.26 mm at the rear edge of a recording sheet of the size "A4."

In the case where the first back roller 5A has a diameter of 16.60 mm, the feed pulse generating circuit 15 is so adjusted that 514 feed pulses are produced to the second step motor 4B whenever one first feed pulse is provided. In this case, the error will be 0.06 mm at the rear edge of a recording sheet of size "A4."

If the length, in the auxiliary scanning direction, of a recording sheet in the recording apparatus is represented by l, then the accumulated error at the rear edge of the recording sheet can be limited to 1/N in maximum, where N is the preset reference pulse number of the second stepping motor 4B and is 512 in the described embodiment. It goes without saying that the maximum value of accumulated error can be set to a desired one by adjusting the number of feed pulses required for one step drive. This can sufficiently prevent the occurrence of color shift.

As is appararent from the above description, according to the invention, the auxiliary scanning of a recording sheet is adjusted by using the stepping motor which carries out the mini-angle stepping operation. Therefore, the yielding of parts such as for instance the back rollers is improved, and the time required for adjustment is reduced, which makes it possible to manufacture the apparatus in low cost.

While the invention has been described with reference to the recording apparatus which carries out the two-color recording operation, the technical concept of the invention can be surely applied to a recording apparatus which carries out recording in more than two colors

What is claimed is:

1. A multicolor transfer heat-sensitive recording apparatus comprising at least two recording stations where images are recorded in different colors, respectively, each recording station including a thermal recording medium for thermal transfer recording, conveying drive means for auxiliary scanning at the associated recording station, a recording sheet which is conveyed through said recording stations in a predetermined order, and a thermal head for selectively heating said thermal recording medium according to a video signal, to transfer an ink image onto said recording sheet, said conveying drive means in one of said recording stations being a stepping motor which carries out an ordinary stepping operation, and said conveying drive means in the other recording stations being a mini-angle stepping motor which conducts a mini-angle stepping operation and which can adjust rotational periods thereof.

2. A multicolor transfer heat-sensitive recording apparatus for thermally transfer-recording images onto a recording paper 1, comprising: first and second thermal heads for selectively heating ink donor sheets 9A and 9B, of different color; first and second drive feed means for drivingly feeding said recording paper and said ink donor sheets, said first and second drive feed means including first and second backing rollers 5A and 5B, first and second stepping motors 4A and 4B drivingly connected to said backing rollers and first and second drivers 14A and 14B for driving said stepping motors, respectively; and pulse generating means 15 for simultaneously feeding for a predetermined duration a single pulse to said first driver for driving said first roller and a number of pulses to said second driver for driving said second roller, said number of pulses to said second driver being adjustable to possibly reduce a recording displacement between said first and second thermal heads.

* * * * *